April 28, 1953  F. C. MELCHIOR  2,636,394
INSTRUMENT ACTUATING MECHANISM
Filed March 19, 1948  2 SHEETS—SHEET 1
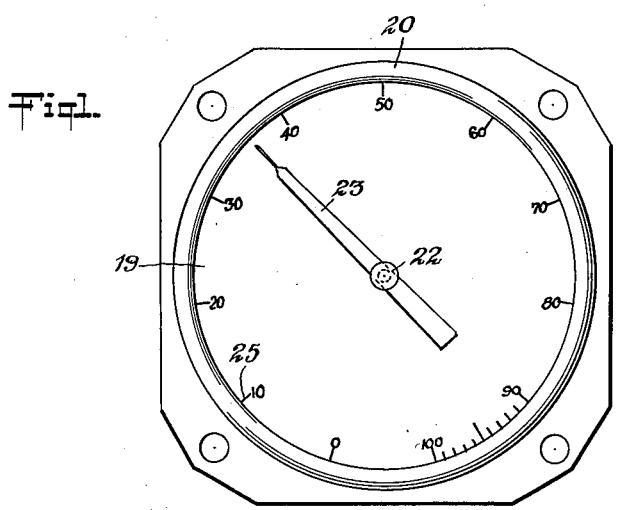
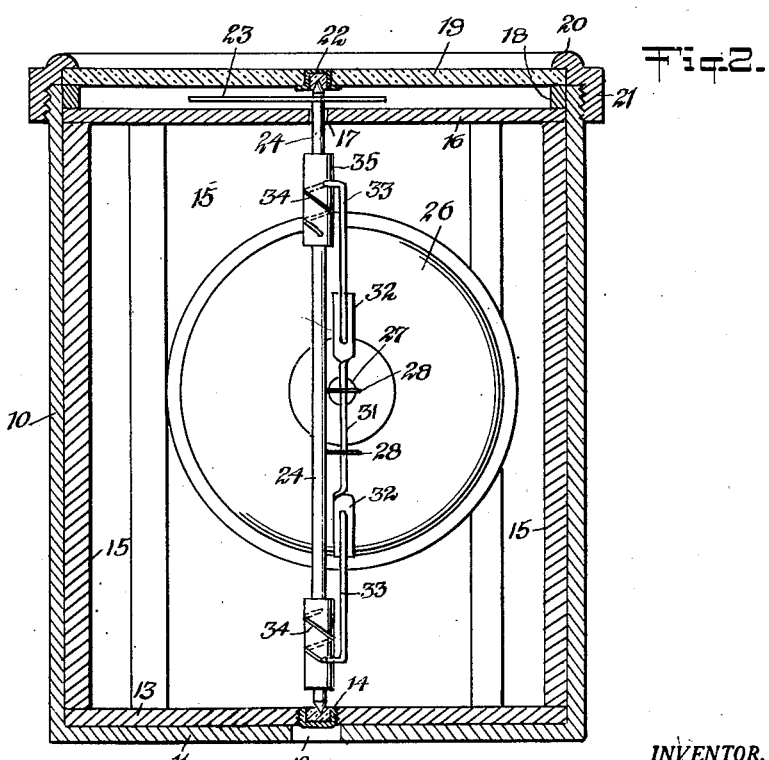
INVENTOR.
Frederick C. Melchior
BY
Munn, Liddy & Glaccum
Attorneys

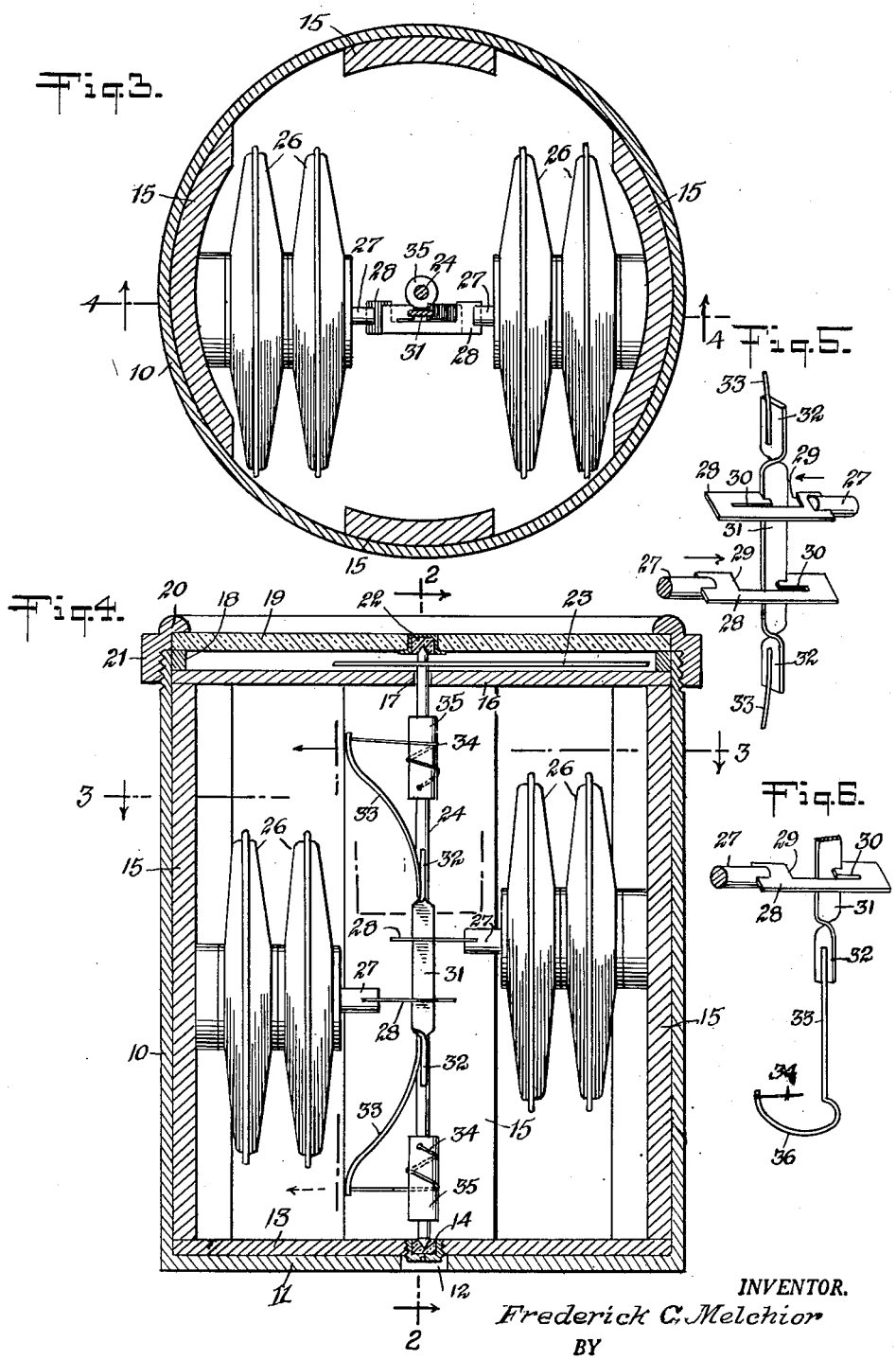

Patented Apr. 28, 1953

2,636,394

UNITED STATES PATENT OFFICE 2,636,394

INSTRUMENT ACTUATING MECHANISM

Frederick C. Melchior, New York, N. Y.

Application March 19, 1948, Serial No. 15,813

10 Claims. (Cl. 74—95)

This invention relates to instruments and indicating devices, particularly the sensitive varieties, in which it is desirable to reduce to an absolute minimum friction and other factors representing work to be done by the actuating element in transmitting motion to the indicating device.

More particularly, it relates to mechanisms used for the purpose of transmitting such motion from the sensitive actuating element to the pointer or indicator.

One object of the invention is to provide a transmitting mechanism which will perform the dual function of transmitting directly any motion caused by even the most infinitesimal stimuli and of preventing any play or backlash in the indicating mechanism.

Another object of the invention is to eliminate as far as possible any rubbing or contact friction which is naturally inimical to high sensitivity.

A further object of the invention is to promote optimum accuracy by reducing to a minimum the factors of hysteresis and drift which account for the basic errors in the consistency of spring action.

In summation, it is the object of this invention to obtain a mechanism of the simplest possible structure embodying a minimum of component parts, all of them entirely functional and balanced, thus proportionally reducing trouble sources and errors as well as the total effort required from the sensitive actuating element in order perfectly to register the most infinitesimal stimuli.

Further and more specific objects, features and advantages will more clearly appear from a consideration of the detailed specification hereinafter set forth, especially when taken in connection with the accompanying drawings which illustrate a present preferred form which the invention may assume and which form part of the specification.

In order best to illustrate the nature and merits of my invention, I have chosen as a logical application thereof a pressure sensitive instrument of the ultra-sensitive variety. However, while the preferred structure here shown represents a most eloquent and useful adaptation in a field where improvements are desirable and valuable, it must under no circumstances be regarded as constituting any limitation of the scope and usefulness of the invention which may well be applied to other fields, such as measurements of thermal and power factors, R. P. M., precision scales, etc. It should therefore be that wide variations from the disclosed embodiment may fairly fall within the scope of the invention in its broadest aspects.

Considering for a moment typical examples of current practice in the field of pressure-sensitive instruments, we find that the motion of the sensitive actuating element is most commonly transmitted to a pointer shaft by means of a pivotally suspended linkage system and sector arm with teeth engaging a pinion on said pointer shaft. In some instances, such as that of the multi-revolution instrument commonly used for aircraft altimeters, auxiliary gears are used, on the clock principle to propel one or two additional hands with shafts and bearings, thus further increasing the friction and destroying the potential sensitivity of the instrument. Moreover, in order to take up "backlash" or "play," a spring loaded filament is sometimes connected to a pulley on the pointer shaft, its sole purpose being to cause the gear teeth to engage in one direction only.

In some of the best applications of the conventional (single and two-revolution) instruments, the total friction has been reduced by suspension of the linkage and sector arms on spring flexures instead of on pivot bearings, thereby confining the contact friction to the pointer shaft bearings and the engagement of the sector teeth with those of the pinion. However, in return, the number of points where bending stresses occur have been increased, thus also increasing the total hysteresis and drift which may normally be regarded as confined to the pressure sensitive element alone. As for the spring-loaded filament referred to above, its hysteresis effect may well be considered as negligible, and the same may be said of its other effects, except in instances where its spring tension tends to counteract the efforts of the pressure-sensitive element, and to increase the contact friction between the sector and the pinion.

The herein invention was conceived with a view to substantial reduction and possible complete elimination of the above mentioned disadvantages. By what I believe to be a novel and useful structure, I feel that such objects have been fulfilled, thus making possible an instrument of this type of exceptional sensitivity and accuracy.

In brief and general terms the invention has to do with the rotation of a pointer shaft in response to the slightest variations in stimuli impressed upon elements responsive to changes in factors such as pressure and other variable conditions to be indicated. It comprises an actuator element in the form of a lever disposed adjacent the shaft to be turned and connected at spaced points thereon to responsive means so that variations in the responsive means will tilt the lever one way or the other around a theoretical pivot point. Thus this lever or plate is in the nature of a floating element, having only a theoretical axis. The ends of the lever are connected at adjacent portions of the shaft to be turned by means of filaments connected to and passing around the shaft in opposite directions. The filaments are connected to the ends of the pivoted lever by means to maintain tension in the filaments at all times. The lever is connected to the responsive means by flexure spring strips or means to support the lever with minimum of friction and hysteresis effects during operation.

A preferred embodiment of the invention is illustrated in the drawings, of which—

Figure 1 is a plan view of the indicating dial of the instrument;

Fig. 2 is a vertical cross section taken on the line 2—2 of Fig. 4;

Fig. 3 is a horizontal section taken on the line 3—3 of Fig. 4;

Fig. 4 is a vertical section through the casing on the line 4—4 of Fig. 3, showing the interior operating parts in elevation;

Fig. 5 is a detail partial perspective view of the relation of the actuating lever with lever-operating members; and Fig. 6 is a similar partial perspective view of a modified form of actuating lever.

Referring now merely to the specific embodiment of the invention shown in the drawings, it comprises a cylindrical metal casing 10, the bottom wall 11 of which is provided with an aperture 12 centrally thereof. Within the casing 10 on the bottom thereof is a circular base plate 13 of suitable material having a central jewel bearing element 14 fitted therein over the aperture 12. Fixed to and rising from the base plate 13 at spaced points along its periphery are arcuate posts 15 fitting snugly within the casing 10 and rising to a point near the top of the casing. Resting on the top of these posts 15 is a cover plate 16 having a central aperture 17. The posts 15 and the cover plate 16 are also preferably of plastic material. On top of the cover plate 16 is disposed a ring washer 18 and on top of that rests a glass plate 19 held in place by a flange 20 on an annular retaining ring 21 having interior screw threads to threadably engage with threads on the outer upper edge of the casing 10 as shown in Figs. 2 and 4. The glass plate has a central opening in which is mounted a jewel bearing 22 over the aperture 17 in the cover plate 16.

In the space between the glass plate 19 and the cover plate 16 is disposed an indicating needle 23 suitably connected to a vertical shaft 24 which is pivoted at its upper and lower ends in the jewel bearings 22 and 14 for swinging movement with minimum of bearing friction. The upper surface of the cover plate 16 is provided with suitable graduation marks 25 visible through the glass plate 19 and over which marks the needle swings as the shaft 24 is turned in its bearings.

In order to turn the shaft 24 so that the needle may indicate the slightest changes in values of the factors being indicated I have illustrated the device as responsive to changes in pressure and to that end have mounted on a pair of the oppositely disposed posts 15 groups of pressure-responsive capsules or bellows 26 which in their expansion and contraction due to changes in pressure horizontally move stems or rods 27. These bellows are disposed as shown in Fig. 4 at slightly different levels so that the rods 27 move horizontally in flat planes at different levels.

On the end of each of these stems 27 is a fixed flat flexure plate or strip 28 which is provided with a deep notch 29 and a slit 30 at the end of the notch farthest from the rod 27. A flat lever plate 31 is disposed vertically within the casing 10 and adjacent and parallel to the shaft 24. This plate or lever is notched to fit over the far side of each notch 29 in the flexure strip 28 as shown in Fig. 5 so that as the rods 27 move horizontally backward and forward they tilt or oscillate the lever 31 around a theoretical axis between the strips 28. Thus it will be seen that this lever functions as a floating element or lever, not being connected to any fixed pivotal axis.

At the opposite ends of the plate 31 its ends 32 are bent at right angles to the main body thereof and to these ends are connected the ends of flexible springs 33 which extend upwardly and outwardly from the same side of the ends of the plate 31 as shown in Fig. 4. To the ends of these spring members 33 are connected the ends of flexible wires or filaments 34 which are wrapped around drums 35 fixed to the shaft 24 near its opposite ends and the other ends of these cords 34 are fastened in any suitable manner to these drums. As shown the respective wires are wrapped around the drums in opposite directions. These wires or filaments are preferably of Invar steel with a very low coefficient of expansion and the springs 33 are likewise made of material with a similarly low coefficient of expansion.

Reference to Fig. 6 will show that the resilient arm 33 in this modified form extends straight down from the lever 31 and is bent around in a horizontal plane in the form of a sort of hook 36 to which the end of the filament 34 is connected.

In the operation of the device, it is clear that as the elements responsive to the factor changes, in this case the pressure-responsive bellows 26, move in opposite directions, they move the flexure strips in opposite directions and thus tilt the floating actuating lever around its theoretical pivot axis and thus will move its opposite ends in opposite directions and pull on one filament and release the other. Since the pivot point of the lever is the center thereof, these opposite movements of the filaments are exactly in balance and permit of no back lash or loose play in the parts. The force exerted through the filaments is one tangential to the shaft drums and therefore exerts a minimum of lateral pressure on the shaft bearings. Thus the shaft and with it the needle are turned with a minimum of friction and wear so that errors due to the presence of friction and wear of the parts are avoided to the maximum degree. The construction of the flexure strip 28 and its connection to the actuating lever is such as to eliminate substantially all effects of hysteresis therein, thereby insuring that over continued operation spring fatigue will not introduce appreciable errors.

While the invention has been described in detail and shown with respect to the accompanying drawing, it is not to be limited to such details, since many changes and modifications may be made in the invention without departing from the spirit and scope thereof. Hence, it is desired to cover any and all forms and modifications of the invention which may come within the language and scope of any one or more of the appended claims.

What I claim as my invention is:

1. A device of the class described having a shaft to be turned and factor-responsive members which comprises an elongated actuating floating element disposed parallel to said shaft and connected to said responsive members at spaced points along its length to pivot the actuating element around a theoretical axis and filamentary connections wrapped around the shaft at each end thereof and connected to the ends of said actuating element.

2. A device of the class described having a shaft to be turned and factor-responsive members which comprises an elongated floating actuating element disposed parallel to said shaft, means resiliently connecting said members to spaced points on said element, and filaments wrapped around the shaft at spaced points and connected to the opposite ends of said element.

3. A device of the class described having a shaft to be turned and factor-responsive members which comprises an elongated floating element parallel to the shaft, filaments wrapped in opposite directions around the shaft at opposite ends thereof and connected to the ends of said element, and means connecting said members to spaced points on said element.

4. A device of the class described having a shaft to be turned and factor-responsive members, which comprises an elongated floating element parallel to the shaft, means operable by said members to oscillate said element in response to factor changes, and filaments connected to the opposite ends of said element and wrapped around the shaft in opposite directions.

5. A device of the class described having a shaft to be turned and factor-responsive members which comprises an elongated floating element disposed parallel to said shaft, resilient strips connected at one end to each of said members and at the other to said element at spaced points thereof whereby said element is tilted as changes in the factor occur, filaments wrapped around said shaft in opposite directions at spaced points thereon and resilient means connecting the other ends of said filaments with the opposite ends of said element to maintain said filaments under regulated tension.

6. A device of the class described having a shaft to be turned and factor-responsive members, which comprises a tiltable floating lever disposed parallel to said shaft, resilient connections between said members at spaced points of said lever, drums on said shaft adjacent the ends of said lever, filaments wrapped around said drums in opposite directions, and means connecting the other ends of said filaments to the ends of said lever to maintain them under regulated tension as the lever is tilted in response to factor variations.

7. A device of the class described having a shaft to be turned and factor-responsive members, which includes rods extending from and operated by said members in a direction at right angles to said shaft and at spaced points along its length, resilient notched strips connected at one end to said rods, and an elongated floating actuating lever notched at spaced points to engage the walls of the notches in said strips farthest from the rods.

8. A device of the class described having a shaft to be turned and factor-responsive members, which includes rods extending from and operated by said members in a direction at right angles to said shaft and at spaced points along its length, resilient notched strips connected at one end to said rods, an elongated floating actuating lever disposed parallel to said shaft and notched at spaced points to engage the walls of the notches in said strips farthest from the rods, resilient arms extending outwardly from the ends of said lever, drums on the shaft adjacent the ends of said lever, filaments wrapped around the drums in opposite directions and connected at their other ends to the resilient arms to maintain said filaments under regulated tension.

9. A device of the class described having a shaft to be turned and a factor-responsive member, which includes a rod on said member to be moved longitudinally in response to factor variations in a direction at right angles to said shaft, a resilient strip connected at one end to said rod, said strip having an elongated notch cut in one side thereof, and having a slit longitudinally extending from the corner of said notch farthest from said rod, and an elongated lever disposed parallel to said shaft, said lever having a notch to receive the side wall of the notch in said strip farthest from the rod.

10. A device of the class described having a shaft to be turned which includes a tiltable floating lever parallel to said shaft, resilient arms on the ends of said lever, drums on said shaft adjacent the ends of said lever, filaments extending from said arms and wrapped around said drums in opposite directions, said arms extending away from said lever on the same side thereof.

FREDERICK C. MELCHIOR.

References Cited in the file of this patent

UNITED STATES PATENTS

| Number | Name | Date |
| --- | --- | --- |
| 725,597 | Sims | Apr. 14, 1903 |
| 1,567,794 | Finley | Dec. 29, 1925 |
| 1,998,136 | Jaenichen | Apr. 16, 1935 |
| 2,332,565 | Fairbank | Oct. 26, 1943 |

FOREIGN PATENTS

| Number | Country | Date |
| --- | --- | --- |
| 28,072 | Great Britain | of 1909 |